United States Patent [19]

Coffield et al.

[11] 3,967,958

[45] July 6, 1976

[54] METHOD OF WINNING COPPER, NICKEL, AND OTHER METALS

[75] Inventors: Thomas H. Coffield, Waterloo, Belgium; Kestutis A. Keblys, Southfield, Mich.

[73] Assignee: Ethyl Corporation, Richmond, Va.

[22] Filed: Aug. 27, 1973

[21] Appl. No.: 391,619

Related U.S. Application Data

[60] Division of Ser. No. 55,850, July 17, 1970, Pat. No. 3,755,099, which is a continuation-in-part of Ser. No. 717,034, March 28, 1968, and a continuation-in-part of Ser. No. 807,987, March 17, 1969.

[52] U.S. Cl.................................. 75/103; 75/108; 75/117; 75/119; 423/32; 423/33; 423/35; 423/143; 423/144; 423/150
[51] Int. Cl.$^2$.................... C22B 15/10; C22B 23/04
[58] Field of Search............. 75/103, 119, 108, 117; 423/143, 150, 417, 32, 33, 35, 144

[56] References Cited

UNITED STATES PATENTS

| | | | |
|---|---|---|---|
| 2,616,781 | 11/1952 | Forward | 423/33 |
| 3,063,808 | 11/1962 | King et al. | 423/417 |
| 3,141,765 | 7/1964 | Brown et al. | 75/103 |
| 3,471,285 | 10/1969 | Rolf | 75/103 |

FOREIGN PATENTS OR APPLICATIONS

583,571   9/1959   Canada.............................. 423/417

*Primary Examiner*—Herbert T. Carter
*Attorney, Agent, or Firm*—Donald L. Johnson; John F. Sieberth; James M. Pelton

[57] ABSTRACT

The invention is a process for winning nickel by treating an aqueous ammonium salt solution of nickel salts with a carbon monoxide-containing gas under reducing conditions to produce nickel carbonyl and subsequently recovering nickel therefrom. Optionally, the production of nickel carbonyl can be catalyzed, for example, by cyanide. Also, an essentially water-immiscible solvent for nickel carbonyl can optionally be employed. The aqueous ammoniacal solution is typically an aqueous ammoniacal ammonium chloride, carbonate, sulfate, hydroxide, or mixture thereof. The valuable metals associated with nickel, e.g., copper, cobalt, iron, and precious metals, are also separated and recovered by this process. The general nature of the process allows a wide variety of primary and secondary sources of nickel to be utilized by combining this process with a number of known ore-treatment steps.

13 Claims, 1 Drawing Figure

METHOD OF WINNING COPPER, NICKEL, AND OTHER METALS

This is a division of application Ser. No. 55,850, filed July 17, 1970, now U.S. Pat. No. 3,775,099 which in turn is a continuation-in-part of application Ser. No. 717,034, filed Mar. 28, 1968 and Ser. No. 807,987, filed Mar. 17, 1969.

BACKGROUND OF THE INVENTION

Winning metals has been a human activity since time immemorial. Civilization has grown with this art; and it is safe to say that the production of metals is the genesis and sustenance of many aspects of modern technology. At the present time, mankind utilizes metals at a large and rapidly increasing rate. For this reason, improvements in techniques for obtaining metals have immediate interest.

The above facts are adequately illustrated by the history of copper. Mankind emerged from the Stone Age upon discovery of copper in its native form. The dawn of the Bronze Age was circa 8000 B.C. — when it was discovered that this copper-tin alloy could be readily shaped into implements and weapons. Copper deposits on Cyprus were worked as early as 3000 B.C. by the Egyptians and these deposits became the chief source of the metal for the Roman Empire. In 1556, Agricola recorded the history of copper. In 1963, world refined copper output exceeded 3,800,000 short tons.

Nickel was isolated by Cronstedt in 1751. By 1804, the properties of the pure metal were known with reasonable accuracy.

Referring to the section on copper in Kirk-Othmer *Encyclopedia of Chemical Technology*, second edition, volumn 6, page 131, and *The Winning of Nickel*, by Boldt, Jr., et al., D. Van Nostrand Co., New York, N.Y. (1967), the production of copper and nickel from ores are tedious, complex processes. Clearly, commerce could not bear the cost of such multi-step processes if these metals were not so important. A detailed discussion of all ramifications of art-known methods for the production of copper and nickel would be out of place here. It is sufficient to relate the following facts.

Copper and nickel are both present in some ores worked today. Since 1899 nickel has been refined by the Mond process which comprises reacting nickel with carbon monoxide to form nickel carbonyl and subsequent decomposition of this product to carbon monoxide and nickel. In the section on nickel in KirkOthmer (supra), second edition, volume 13, page 735, (739) there is described a hydrometallurgical refining process for nickel (practiced by Sherritt Gordon Mines Limited of Toronto, Canada). In this process, concentrates of pentlandite, (Ni, Fe) $_9S_8$, are dissolved in an aerated ammoniacal solution. The nickel, copper and cobalt sulfides dissolve as ammines, with iron remaining in the residue as hydrated ferric oxide. Subsequently, copper is precipitated, and the remaining nickel solution is oxidized to destroy sulfamate. The resultant solution is treated with hydrogen at 35 atmospheres and 190°C. to yield 99.9% nickel which is sintered into briquettes.

The Sherritt Gordon process is described in more detail in Boldt, Jr. (supra), page 299 ff. As described therein, the copper is removed from the ammoniacal solution by boiling off ammonia to precipitate cupric sulfide. The last traces of copper are removed by adding $H_2S$. This must be done before nickel is precipitated with hydrogen, to avoid contamination of the nickel with copper.

In general, nickel and associated metals are recovered and separated by pyrometallurgical, hydrometallurgical, or electrolytic refining techniques. For sulfide ores, the general operations of roasting, smelting, and converting produce a nickel matte product which is suitable for refining to pure metal electrolytically. In contrast to sulfide ore processing, the oxide ores may be more economically processed by hydrometallurgical or carbonyl processes to produce very high purity nickel. However, this is not true in all cases since one commercial operation utilizes pyrometallurgical techniques to prepare ferronickel from a laterite ore. A roasting operation decreases the sulfur content of a sulfide ore concentrate by about one-half. Previous processes have used multiple hearth furnaces, sintering machines, or fluidized bed reactors. When followed by smelting operations using shaft furnaces, reverberatory furnaces or electric arc furnaces to slag off siliceous and other oxide compounds, a typical nickel sulfide matte containing about 15% nickel-copper, 50% iron, and 25% sulfur is produced. This nickel-sulfide matte is then charged to a converter and air is blown through the charge to oxidize iron sulfide selectively. Usually, horizontal converters are used. Recently a process using a top-blown rotary converter in which an oxygen lance is blown onto the surface of the molten charge has been placed in successful commerical operation. The nickel sulfide matte essentially free of iron-produced in the converting operation, typically contains about 48% nickel, 27% copper, 22% sulfur, and less than 1% iron. This matte is sulfur deficient and, therefore, contains a metallic phase which must be processed to separate the nickel sulfide and copper sulfide. In one process, a slow cooling step is used whereby the sulfur deficient matte cast from the converter is cooled slowly over a period of several days. The nickel sulfide, copper sulfide, and copper-nickel metallics separate, allowing regular ore dressing operations to be used to separate the solidified matte into its components. Thus, the nickel-copper alloy is removed magnetically and the nickel and copper sulfides are then separated by flotation. The nickel sulfide can then be either sintered to provide 90% nickel for direct use by steel producers, or roasted to the oxide, smelted and cast into anodes for electro-refining. Alternatively, the nickel sulfide matte can be cast directly into anodes for electro-refining.

In electrolytic refining, metallic nickel of high purity is produced. A major portion of the world's nickel production includes this process as a last step in winning nickel. In addition, the recovery of precious metals and other elements such as cobalt is practiced. A divided electrolytic cell with a porous diaphragm separating the anode and cathode is used in the electrolytic process. The diaphragm prevents impure anolyte from directly contacting the nickel cathode starting sheet. The impure anolyte obtained by solution of the anode is pumped away from the cell to another area where impurities are removed. The nickel cathodes containing 99.9$^+$% nickel are removed after about ten days operation of the cell.

In addition to the Sherritt Gordon process described above, other hydrometallurgical refining processes are commercially employed to win nickel by gaseous reduction of nickel salt solutions derived from both sulfide and oxide ores. Preparatory ore-dressing treatments provide a uniform feed for the reduction and leaching process. Leaching procedures vary depending on the particular ore treated. However, the nickel carbonates produced from the aqueous solution are calcined to marketable nickel oxide, or further sintered to upgrade the nickel metal content to about 88%. A process to recover nickel and cobalt from a limonitic-type laterite ore from Cuba treated the ore with sulfuric acid at elevated temperature and pressure to dissolve nickel and cobalt preferentially. The iron remained essentially undissolved. The liquid separated from the residue contained 95% of the nickel found in the ore. After further purification of the aqueous phase, the nickel sulfate is reacted with hydrogen at high pressure and at about 190°C. to recover most of the nickel as a 99.8% pure product.

Nickel is also produced in the form of ferronickel and nickel rondelles. Ferronickel is produced by a pyrometallurgical process of melting, reduction, and refining. One commercial process in New Caledonia reduces the ore with coke in electric furnaces. Another commercial process in Oregon involves mixing molten ore with ferrosilicon and crude ferronickel. By pouring the molten materials back and forth in special ladles, the molten ore is reduced and the resulting ferronickel product contains about 48% nickel. This crude product is further refined to lower the impurity level. Nickel rondelles are produced by reacting the ore with coke and gypsum in blast furnaces, blowing the nickel-iron matte and a siliceous flux with air and converting to produce a low-sulfur nickel matte, roasting to the oxide, grinding, compacting, and reducing to the metal with charcoal. The resulting nickel rondelles contain 99% nickel.

Data on the reduction of copper (II) salts with carbon monoxide has been published; Byerley et al., *Met. Soc. Conf.*, 24, 183 (1963); *Chem. Abs.* 64, 13441 h (1966). Conversion of aqueous nickel to nickel carbonyl has been disclosed in *Chem. Abs.* 53, 12606 H (1959).

SUMMARY OF THE INVENTION

Discoveries on which this invention is based are as follows:

1. The reduction of copper (II) salts to copper metal with carbon monoxide is promoted by the presence of nickel carbonyl, manganese carbonyl, or cobalt carbonyl.
2. With ammoniacal solutions of copper and nickel salts, it is not necessary to separate copper before winning the nickel.
3. Cupric salts can be reduced to copper metal simultaneously and in the same reaction zone wherein nickel carbonyl is produced from nickel (II) salts, via use of carbon monoxide or synthesis gas treatment.
4. The reduction of nickel (II) salts to nickel carbonyl with carbon monoxide is promoted in the presence of a ligand selected from cyanide, sulfide, cysteine, and tartrate.
5. Practically complete conversion and separation of nickel, copper, and cobalt is possible by treating ammonium salt solutions of those metals prepared from an ore, an ore concentrate such as a beneficiated raw ore concentrate, a nickel-iron or a nickel-sulfur matte, or a ferronickel product, with carbon monoxide or synthesis gas under conditions whereby the nickel and cobalt values are reduced to form metal carbonyl compounds, and the copper is reduced to metallic copper.

Based on these discoveries, this invention is a process for winning nickel by treating a nickel-containing solution of various metal ions with a carbon monoxide-containing gas and forming a nickel carbonyl compound which can be easily separated from the solution and from other metal compounds or metals. Moreover, valuable metals associated with nickel, e.g., cobalt and copper, may be simultaneously converted to carbonyl compounds or reduced to the metallic state and, thereafter, be easily separated and recovered.

In part, this invention also resides in new improved processes for separation of nickel, cobalt, copper, and iron from ores (or other materials) containing these metals. Such processes are outlined below as follows.

A source of nickel, copper, cobalt, and iron, such as a sulfide-type nickel ore concentrate, is treated with aqueous ammonia and aerated. The resulting aqueous ammonia solution — after removal of the precipitated iron — contains nickel, copper and cobalt values as ammine sulfates. This solution is put in a reaction zone having a surface suitable for subsequent copper deposition or alternatively, the solution can be seeded with finely divided copper. In either event, the ammoniacal solution is thereafter treated with carbon monoxide or synthesis gas under pressure. As reduction proceeds, nickel ion is reacted to nickel carbonyl. This can be removed and decomposed thermally to nickel powder. During the reduction step, copper ion is reduced to the metal and deposited. The copper is removed from the reaction zone. During the reduction step, cobalt ion is reduced to the cobalt tetracarbonyl anion which remains in the solution. As such, it can be separated from nickel and copper. The cobalt can be recovered by injecting an oxygen-containing gas into the solution whereby cobalt is oxidized to hydrated cobalt oxide. It is then filtered from the solution and heated to remove the waters of hydration. After cobalt removal, the solution contains ammonium sulfate, which is isolated as a by-product.

Another process for winning nickel is to prepare an ammonium salt solution of a laterite ore by crushing and grinding the ore to a fine uniform feed of approximately constant composition, roasting the ore in a reducing atmosphere typically with producer gas, cooling the reduced ore under non-oxidizing conditions, leaching the reduced ore with an aqueous ammonium salt to solubilize nickel and cobalt. The ammonium salt solution is treated with carbon monoxide under conditions to form nickel and cobalt carbonyl compounds, each of which may be separated and recovered.

Still another process contemplated by this invention is the oxidative leach and carbon monoxide or synthesis gas treatment of a ferronickel product produced from either an oxide or sulfide ore. Recovery of nickel and cobalt proceeds as before from the carbonyl compounds produced.

A still further process for winning nickel is the oxidative leach and reductive carbonylation of a furnace or converter matte produced by conventional procedures from a convenient source of either sulfide or laterite ores. After the matte is produced, it is treated by an oxidative leach with an ammonium salt solution to dissolve the desired metals. Treatment of the resultant solution with a carbon monoxide-containing gas reacts nickel and cobalt, and if present, copper, to the above stated forms which can be separated and recovered from the solution.

In addition, nickel may be recovered from scrap metal containing a recoverable quantity of nickel by comminuting the scrap, dissolving the nickel values selectively, using an oxidative leach with an ammonium salt solution and treating said solution with a carbon monoxide-containing gas. The nickel is reduced to a carbonyl compound and separated and recovered from the solution. Other metal values such as copper and cobalt associated with the scrap metal may also be recovered according to this process.

Nickel may also be recovered from manganese nodules found on the deep sea floor. The nodules are comminuted, subjected to a reducing roast, cooled under non-oxidizing conditions, and leached with an aqueous ammonium salt to solubilize the nickel values, as well as copper and cobalt. The solution is treated with a carbon monoxide-containing gas under conditions to form metal carbonyl compounds or the metal itself in the case of copper. The valuable metals are then recovered as previously described.

In each case, briefly described above, a promoter may be employed to accelerate the formation of the carbonyl compounds.

DESCRIPTION OF THE DRAWING

The figure of the drawing is a schematic representation of the production of nickel carbonyl from a solution containing nickel ions by reacting said solution with a carbon monoxide-containing gas in the presence of a catalyst.

DESCRIPTION OF PREFERRED EMBODIMENTS

The invention is a process for recovery and separation of nickel and metal values associated therewith derived from a sulfide or laterite source of nickel ore. The process comprises establishing a solution or slurry containing nickel and the metal values associated therewith from which iron has been removed and contacting said solution or slurry with a carbon monoxide-containing gas to form carbonyl compounds of the metal values. The nature and properties of the carbonyl compounds allow easy and complete separation of the metal carbonyl compounds from the solution or slurry.

As a convenient source of metals for the process of this invention, materials rich in nickel such as sulfide or laterite ores and the processed materials derived therefrom such as concentrates, mattes, and leach solutions, and scrap metal, and ocean nodules may be treated. The treatment of the source of nickel and metals associated therewith is largely a matter of choice, depending upon the type of ore, its situation in the natural state, or the economics of obtaining a convenient source of metal values to be treated by the process of this invention.

Establishment of a solution or slurry from the source of ores described above can be by solubilization, selective leaching, or physical separation of metallic constituents, as for example by flotation. In short, any art-recognized method of obtaining a solution or slurry of nickel and associated metals may be used to prepare a solution or slurry suitable for subsequent carbonylation. The concentration of metals in the solution or slurry may very widely. Indeed, any concentration conveniently obtained may be used to produce nickel and associated metals by the process of this invention. Diluted solutions, saturated solutions, or super-saturated solutions, for example slurries, may be used in the separation and recovery of nickel and associated metals in this process.

Any means which the art has recognized as sufficient to dissolve nickel and its associated metals may be used to prepare a solution or slurry of said nickel and associated metals. The only requirement is that the nickel be in a form that has at least some water-solubility or that it is rendered soluble by the action of a coordinating agent such as ammonia. The anion associated with the nickel is not critical. For example, the nickel may be in the form of the water soluble nickel salts such as nickel acetate, nickel ammonium chloride, nickel ammonium sulfate, nickel bromide, nickel chloride, nickel fluoride, nickel iodide, or nickel sulfate. The nickel may be in a normally insoluble form which is rendered at least partially soluble by an agent such as ammonia. These nickel compounds would include nickel carbonate, basic nickel carbonate, nickel oxide, nickel phosphate, nickel hydroxide, and the like.

The aqueous reaction media may be water or water-containing an ammonium salt. The function of the ammonium salt is to at least partially solubilize the nickel compound. Useful ammonium salts include ammonium chloride, ammonium carbonate, ammonium sulfate, ammonium phosphate, ammonium bromide, ammonium iodide, ammonium phosphite, ammonium sulfite, ammonium cyanide, ammonium fluoride, ammonium sulfide, and the like, including mixtures thereof. The reaction media may also be aqueous ammonium hydroxide.

The concentration of the ammonium salt solution is not critical. As stated above, it is not even required when the nickel compound has some water solubility. When required, a preferred concentration range is from about 0.1 wt. % up to a saturated ammonium salt solution. In general, good results are obtained using a 2–20 wt.% aqueous ammonium salt solution. A most preferred range is from about 3–10 wt. % ammonium salt.

Most preferred aqueous reaction media are ammoniacal ammonium salt solutions. These are solutions of ammonium salts such as the above containing dissolved ammonia. The amount of excess ammonia can range up to complete saturation of the aqueous media. A preferred amount of ammonia is from about 1–40 wt.% $NH_3$. A more preferred range is from 2–20 wt.% $NH_3$, and a most preferred $NH_3$ concentration is from about 2–10 wt.%

The amount of ammonium salt in the aqueous reaction media should be at least sufficient to provide on an equivalent basis an amount of anions equal to the amount of metallic nickel, copper, or cobalt present. Preferably, the amount of anions provided by the ammonium salt should be in excess of the equivalents of metallic nickel, copper, or cobalt present. A useful range based on the equivalent of nickel, copper, and cobalt present is from stoichiometric to about 100 equivalents of anion per equivalent of the above metals. It is apparent from the above, for example, that a low sulfur matte will require more ammonium salt in the aqueous reaction media than a high sulfur matte because it will contain more metal in the metallic state requiring more anions to be supplied by the ammonium salt to dissolve or leach the matte into solution.

When the nickel is at least partially dissolved, the resultant solution or slurry is treated with a carbon monoxide- containing gas. An amount of the carbon monoxide-containing gas at least sufficient to combine with nickel and its associated metals is introduced into the solution by a wide variety of methods. The particular method of introduction is not critical. The only requirement being that intimate contact of the solution and carbon monoxide-containing gas is established. A preferred carbon monoxide-containing gas is carbon monoxide. However synthesis gas, a combination of hydrogen and carbon monoxide, may also be used. A preferred method of treating the solution is to introduce the carbon monoxide-containing gas under super-atmospheric pressure. Pressures of carbon monoxide from 50 to about 3000 psig. may be employed. A preferred range of carbon monoxide pressure is from 50 to about 1800 psig.

One skilled in the art will readily see that pressure is not an entirely independent variable but depends upon the system being treated. That is, the type of ore and the type of salt solution will affect the pressure required to carry out efficient carbonylation.

Temperatures at which the carbonylation process is carried out are those which facilitate a desirable rate of reaction and also allow convenient processing equipment to be utilized. Temperatures depend on the type of feed and the aqueous reaction media used in the carbonylation process. Thus, the temperature is in many instances dependent upon the pressure, feed and rate of reaction desired. A general range of temperatures under which carbonylation can be carried out are from 50° to about 250°C. A preferred range of temperatures is from about 100° to about 175°C.

It has been found that the reaction of the carbon monoxide-containing ammoniacal salt solution is accelerated in the presence of certain promoters. The method by which such acceleration takes place is not fully understood. However, the rate of carbonylation is markedly increased by addition of certain promoters. It has been found that such promoters are ligands selected from alkoxide anions, organic acid anions, inorganic acid anions, and inorganic anions. A preferred group of ligands found to be useful in promoting the carbonylation process are cysteine and tartrate, sulfide and cyanide. A preferred promoter ligand is cyanide ion. The manner of introducing the promotor into the reaction medium is not critical and the only requirement is that the catalytic species be soluble in the reaction medium. A preferred amount of the promoter or catalyst ligand is a catalyst-to-nickel ratio of 0.01–1 mole of promotor per mole of nickel. A preferred range is from 0.01–0.5. It should be understood that the particular catalyst concentration useful in the process of this invention depends on the reaction system employed and the feed material being carbonylated.

The duration of the reaction is a function of the system being carbonylated and may vary depending on the pressure, temperature, the type of feed, and the solubilizing agent and the use of a catalyst. Under the broad range of conditions employed, carbonylation reaction times of up to about 10 hours have been noted. However, under preferred conditions, the reaction is essentially completed after about 2 hours. In fact, the major portion of the reaction is completed within the first one-half hour when a catalyst is employed. Completion of the reaction is shown by a sharp decrease in rate of pressure drop in the reaction vessel. It should be understood that the reaction time is not a completely independent variable and can be varied according to reasonable requirements of the individual reaction system.

In a preferred process, the nickel and associated metals, after being taken into solution, are carbonylated in an ammonium salt solution. A most preferred embodiment is the use of an aqueous ammoniacal ammonium carbonate solution wherein ammonia and carbon dioxide are added to an aqueous media which is used to leach the nickel and associated metals from their source material. In general, the solutions use a ratio of ammonia-to-metal in the ammonium salt solution of from zero to 1 to about 100 to one moles of ammonia per mole of metal. A preferred amount of ammonia in such a system is from 0 to 50 moles of ammonia per mole of metal in the solution. A most preferred range is from 0 to 10 moles of ammonia per mole of metal in solution.

The nickel carbonyl formed by the reaction of the carbon monoxide-containing gas and the nickel may be separated from the reaction solution by taking it up in a water-immiscible, substantially inert solvent for nickel carboryl or by sweeping out the reaction vessel with additional carbon monoxide-containing gas. The exact nature of the solvent is not critical so long as it is immiscible with water, dissolves nickel carbonyl, and is substantially inert under the reaction conditions. In a preferred embodiment, a solvent less dense than water is used. Nickel carbonyl is soluble in many organic solvents such as paraffins, mixtures thereof, benzene, toluene, and carbon tetrachloride. Preferred solvents are paraffin fractions such as ligroin, gasoline, kerosene, and paraffinic materials such as cyclohexane, heptane, octane, nonane, and the like. Normal or branched chain paraffins can be used as well as mixtures thereof. A most preferred solvent is a saturated aliphatic hydrocarbon such as hexane, heptane, octane, nonane, decane, dodecane, their branched chain derivatives, mixtures of these, and the like.

The amount of solvent which is used is not critical. It is only necessary to use the amount of solvent required to dissolve the desired amount of nickel carbonyl. There is no real upper limit on the amount of organic solvent, this being defined by such considerations as economics, size of the reaction vessel, ease of separation of nickel carbonyl therefrom, and the like. Generally from 0.1 to 2 volumes of organic solvent are used per unit volume of aqueous reaction media. Preferably from 0.1 to 0.5 volumes are employed.

As stated above, the nickel carbonyl may also be separated from the reaction media by passing a carbon monoxide-containing gas through the solution, allowing the nickel carbonyl to vaporize into the carbon monoxide-containing gas. When the reaction is completed, nickel carbonyl is present both in the vapor phase above the reaction solution and dissolved in the solution itself. As the pressure is released, the vapor phase containing the carbon monoxide-containing gas and vaporized nickel carbonyls is vented to a nickel carbonyl recovery zone, for example, a thermal decomposition zone. Additional carbon monoxide-containing gas is introduced through the solution and nickel carbonyl vaporizes into the gas and it is passed out of the reaction vessel into the recovery zone. Thus, substantially complete removal of nickel carbonyl is obtained. The carbon monoxide-containing gas used to sweep out the nickel carbonyl may be the same as that employed to react with the nickel. As stated above, preferred carbon monoxide-containing gases are carbon monoxide and synthesis gas. The amount of sweep gas is not critical and depends on the reactor size, temperature, and pressure of the system. Generally, from about 1 to 1000 volumes of the carbon monoxide-containing gas is sufficient.

Figure 1:
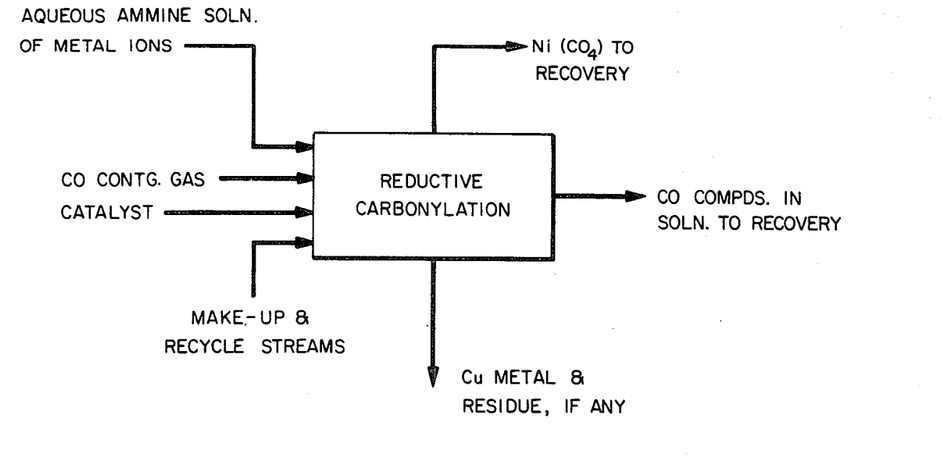

Referring again to the drawings, FIG. 1 is a schematic representation of the general process of this invention. The block labeled "reductive carbonylation" represents a suitable reactor in which the process is carried out. Any convenient reaction vessel may be utilized within the limitation of sound engineering and economic principles. A feed of aqueous ammine solution containing metal ions; e.g., nickel, copper, cobalt, and the like, is charged to the reactor. Catalyst (e.g., cyanide ion) is added and the reactor is pressurized with a carbon monoxide-containing gas. Any recycle stream containing recovered metal ions from the solution or residue, if any, or additional ammine solution required to adjust the concentration of the reaction solution may be added. The reactor is brought to reaction temperature and the solution agitated mechanically. The beginning of the reaction is signalled by a decrease in the pressure of the carbon monoxide-containing gas. Completion of the reaction is shown by cessation of pressure drop. The nickel carbonyl is then separated from the solution and sent to recovery units. The solution containing cobalt carbonyl compounds is also sent to recover the metals therefrom. Any copper metal present will be deposited in the reactor and can then be recovered. If other impurities in the solution are present, a residue may form and the copper must be separated therefrom.

This general process can be varied as appreciated by one skilled in the art, without departing from the scope of the invention. For example, as described above, a solvent for nickel carbonyl may also be added to the reaction mixture. Its purpose is to selectively solvate the nickel carbonyl formed and provide a means for removing it from the system. The reaction may also be run on a continuous basis with appropriate modifications for maintaining the pressure, temperature and reaction rate. In such a case, the reaction solution withdrawn must be processed to remove unreacted metal ions and recycle them to the reactor if required.

The process is further illustrated by the following examples. All parts are by weight unless otherwise stated.

EXAMPLE 1

A glass lined rocking autoclave was charged with 5.0 g. of copper sulfate pentahydrate, 5.25 g. of nickel sulfate hexahydrate, 21 ml. of concentrated ammonia, 25 ml. of water, and 10 ml. of heptane. The autoclave was pressured with 640 psig. hydrogen and 1200 psig. carbon monoxide, then heated 2 hours at 150°C.

The resultant mixture consisted of a colorless heptane phase, metallic copper, and a light blue aqueous solution. The heptane phase was siphoned off and combined with subsequent heptane extracts of aqueous phase. The nickel carbonyl and heptane solution was treated with excess bromine in carbon tetrachloride. The resulting mixture was filtered, washed with carbon tetrachloride and dried. This gave 2.55 g. of nickel bromide. This corresponds to a 58% yield of nickel carbonyl based on starting nickel sulfate.

The copper metal was filtered, washed and dried in vacuo, yielding 0.90 g. of copper metal. This corresponds to a 71% yield based on starting copper sulfate.

This example illustrates that cupric salts present in an ammoniacal aqueous solution can form metallic copper in the presence of hydrogen and carbon monoxide even though nickel salts are present in the pregnant solution. It also illustrates that nickel (II) and salts in aqueous ammoniacal solution form nickel carbonyl in the presence of copper ammines. There is another facet to the example. Specifically, the copper metal and nickel carbonyl were separable in the absence of an overt contamination of either product; even though hydrogen gas was present in the reducing atmosphere. This example also illustrates that it is possible to extract nickel carbonyl with an essentially waterimmiscible solution while reductions are taking place.

EXAMPLE 2

A pregnant aqueous solution contains in grams per liter:

| | |
|---|---|
| nickel | 45 |
| cobalt | 0.7 |
| copper | 7 |
| ammonium sulfate | 150 |
| free ammonia | 95 |

This solution is treated with 0.05 gram per liter of copper powder (finely divided) and then fed into a pressure vessel. The reaction vessel is charged with heptane so that the ratio of volume of pregnant solution to heptane is 10 to 1.

The pressure vessel is equipped with a stirrer which is activated. Then, the sealed vessel is charged with 800 psig. of synthesis gas at 175°C. The vessel contents are maintained at this temperature for two hours. After that time, the stirrer is turned off and the vessel contents allowed to cool to ambient temperature.

Thereafter, the aqueous layer is drawn off and the copper metal removed by filtration. The filtrate is sent downstream for recovery of cobalt values and ammonium sulfate by-products.

The heptane layer is drawn off and the nickel carbonyl separated by distillation. In this example, nine-tenths of the nickel carbonyl is decomposed to form nickel metal powder. The remaining one-tenth is reacted with bromine to form nickel bromide.

This nickel bromide is used to form nickelocene according to U.S. Pat. No. 2,680,758. The nickelocene can be further reacted according to procedures in U.S. Pat. No. 3,054,815, to form other ogano nickel compounds. In addition, it is appreciated by a skilled practitioner that nickel carbonyl, nickel bromide, or nickelocene can be directly or ultimately used to form antiknock compounds such as those described in U.S. Pat. Nos. 3,086,035; 3,086,036; 3,086,037; 3,086,034; 3,086,984; 3,088,962; 3,088,963; 3,097,224; 3,097,225; etc.

The process of Example 2 can be used to treat solutions having in grams per liter:

| | |
|---|---|
| nickel | 40 – 50 |
| cobalt | 0.7 – 1 |
| copper | 5 – 10 |
| ammonium sulfate | 120 – 180 |
| free ammonia | 85 – 100 |

Likewise, solutions having greater or lesser quantities of these substituents can be so treated.

Likewise, the process of the preceding example can be used to treat concentrates having nickel 10%, cobalt 0.5% copper 2%, iron 38%, sulfur 31% and rock 14% by leaching such a solid pentlandite flotation concentrate with aerated ammonia and then treating the concentrate with synthesis gas under conditions as set forth in the preceding example.

Similarly, the procedure of the above example can be employed using a temperature of from 100° to 250°C., a $H_2$ pressure of from zero to 1200 psig., a carbon monoxide pressure of from 200 to 1200 psig., a time of from 1 to 4 hours, an amount of organic solvent (per unit volume of aqueous solution) of from 0.1 to 2.0, said solvent being selected from ligroin, n-octane, kerosene, n-nonane, and cyclohexane.

aqueous phase contained unreacted nickel sulfate corresponding to 51% of the amount charged.

The following table shows effect of the addition of cyanide ion in the form of potassium cyanide, KCN. The reaction procedure is substantially the same as in Example 3 above. The various Examples 4–9 illustrate the effectiveness of the addition of a small amount of cyanide ion to the reaction mixture. Further, the catalysis by cyanide ion is not affected to any substantial extent by the presence of other metal ions.

TABLE I

| Reaction Variables | | Cyanide-Catalyzed Reduction of Nickel, Cobalt, and Copper Sulfates | | | | | |
|---|---|---|---|---|---|---|---|
| | | Ex. 4 | Ex. 5 | Ex. 6 | Ex. 7 | Ex. 8 | Ex. 9 |
| Initial Molar Ratios: | $NiSO_4$[1] | 9 | 110 | 110 | 110 | 110 | 110 |
| | $CoSO_4$ | — | — | — | 12 | — | 12 |
| | $CuSO_4$ | — | — | — | — | 27 | 27 |
| | KCN | 1 | 1 | 1 | 1 | 1 | 1 |
| Total Pressure Drop, psi. | | 395 | 410 | 410 | 425 | 400 | 315 |
| Reaction Time, hrs. | | 1.5 | 2.2 | 2.2 | 2.5 | 3.0 | 3.0 |
| Duration of Gas Uptake, hrs. | | 0.75 | 1.8 | 1.8 | 2.5[2] | 3.0[2] | 3.0[2] |
| Results | | | | | | | |
| Recovered: $NiSO_4$% | | 4.8 | 1.9 | 1.9 | 2.4 | 8.8 | 30.8 |
| $CoSO_4$%[3] | | — | — | — | 68.3 | — | 74.4 |
| $CuSO_4$% | | — | — | — | — | 37.6 | 47.2 |
| Conversion[4] to $Ni(CO)_4$, % | | 90 | 98 | 98 | 94 | 92 | 72 |
| Conversion[4] to Cu metal, % | | — | — | — | — | 63 | 53 |

[1]54.5 mmoles of $NiSO_4$ used in each run. The metal sulfate-ammonia ratio was 1:6 in each run. Total volume of each run was 100 ml of aqueous phase and 10 ml of heptane. All runs were carried out at 150°C. and 600 psi. initial carbon monoxide pressure. Examples 4–9 were repressured three times back to 600 psi.
[2]Gas was still being taken up very slowly when reaction was stopped.
[3]The amount of cobalt found in aqueous solution.
[4]Mmoles product found over mmoles of starting metal sulfate.

The procedure of the above examples can be extended to recovery of Ni, Cu, Co, Fe and precious metals. Thus, a sulfide concentrate containing these metals is smelted in air in a smelting furnace. Iron values can be recovered as known in the art and separated from a matte containing (some iron), nickel, copper, cobalt, and precious metals.

The matte is subjected to a pressure oxidation to yield soluble ammine sulfates of nickel, cobalt, and copper.

Iron values and precious metals are in the residue. The precious metals are recovered as known in the art. The ammine sulfates are treated as in the previous examples to recover and separate copper, nickel, and cobalt.

The use of a catalyst for the formation of nickel carbonyl is a preferred embodiment of the invention and is illustrated by the following examples.

EXAMPLE 3

To a reaction vessel equipped with a stirrer was added 327 millimoles ammonium hydroxide (13.6 molar solution), 54.5 millimoles $NiSO_4$, enough water to make a total volume of 100 ml. and then 10 ml. of heptane. The reaction vessel was closed and sealed, pressure lines were connected and the vessel flushed with nitrogen. After pressuring with nitrogen to 60 psig., the autoclave was heated to 150°C. On reaching temperature equilibrium, the reaction vessel was pressured further to about 600 psig. with carbon monoxide. The reaction was continued for three hours. The total pressure drop in the reaction was 235 psi. After rapid cooling, the autoclave was vented.

The organic layer was separated. The amount of nickel carbonyl was determined by decomposition with bromine. The yield of nickel carbonyl was 30%. The

EXAMPLE 10

The procedure of Example 9 is repeated except that the molar ratio of cyanide ion to metal is 1:1. The results obtained from such a reaction are similar to those of Example 9.

Similar results are obtained when the reaction is run under a carbon monoxide pressure of 400 psi. The reaction vessel may be repressured at regular intervals to maintain the carbon monoxide at about this level. Also, petroleum ether can be used for the solvent to extract the nickel carbonyl.

EXAMPLE 11

The reaction vessel of Example 3 is filled according to the procedure of Example 1 with 327 mmoles of ammonium hydroxide, 54.5 mmoles of nickel sulfate, 13.6 mmoles of copper sulfate, enough water to make 100 ml. total volume, and then 10 ml. of heptane. Cyanide ion in the form of HCN gas is added to the reaction mixture in an amount sufficient to make the molar ratio of cyanide ion to metal of 1:6. The reaction vessel is pressured to 2500 psig. with synthesis gas and heated to 150°C. The reaction is stopped after 3 hours and the products analyzed. The yield of nickel carbonyl is about 75% and about a 50% yield of copper metal is obtained.

Similar results are also obtained when the catalyst concentration of cyanide ion is about 0.1 mole per cent based on the amount of nickel present.

EXAMPLE 12

The process of Example 3 is repeated except that cyanide ion catalyst at a concentration of about 10 mole per cent based on nickel is added. The rate of nickel carbonyl formation is increased by a factor of 10, and high yield of nickel carbonyl is obtained.

Similar results are obtained in this process using nonane as the hydrocarbon solvent. Also, the addition of cyanide ion in the form of NaCN brings similar results.

Similar results to those above are obtained when a nickel sulfide-containing ore concentrate is mixed with aqueous ammonia, aerated, and then contacted with carbon monoxide at a pressure of 600 psig. and a temperature of 100°C. in the presence of cyanide ion catalyst.

EXAMPLE 13

Using the procedure of Example 3, a typical sulfide ore from Maine is concentrated by known methods to give a nickel-containing sulfide ore concentrate having the following analysis: Ni — 8.75%, Fe — 44.15%, Co — 0.85%, Cu — 0.73%, S— 34.24%, insol. — 5.64%, trace metal — 3.36%.

This concentrate is mixed with aqueous ammonia, $NH_4OH$, and aerated according to known procedures. The aeration of the ammoniacal solution precipitates out iron as hydrated ferric oxide. Many other trace metal values are insoluble in $NH_4OH$ and, after these are removed, the Ni, Co, and Cu values are left in the ammonia leach solution as the ammonium sulfate complexes. The ammonium concentration in this solution is adjusted to give a $NH_4OH$ to nickel ratio of about 4:1 or 6:1 as desired.

To the solution is now added KCN in molar ratio of 110:1 of $NiSO_4$:KCN, heptane to form an organic layer on top. The vessel is sealed and pressured with carbon monoxide to 1600 psig. and the temperature is maintained at 150°C. for 3 hours. When the vessel is vented, the organic layer is drawn off and the ammoniacal solution is removed. Metallic copper left in the bottom of the reaction vessel is removed from the reaction vessel.

Recovery of metal values is as follows: Cu — 53%; Ni — 72%, (as $Ni(CO)_4$), Co — 74.7% (as $CoSO_4$).

Another embodiment of this invention comprises the discovery that nickel carbonyl catalyzes the formation of copper from ammoniacal solutions of copper ammines. Thus, when treated with carbon monoxide, ammoniacal solutions of copper salts will give copper metal. When the same reaction conditions are employed — together with nickel carbonyl present in the system — the yield of copper metal is increased. This is demonstrated by the following example.

EXAMPLE 14

A glass liner of a rocking autoclave was charged with 9.99 g. of $CuSO_4.5H_2O$, 16 ml. of concentrated ammonium hydroxide, and 35 ml. of water. The autoclave was pressured with 600 psig. of carbon monoxide and 600 psig. of hydrogen. The resultant mixture was heated for two hours at 150°C.

The resultant reaction mixture consisted of a colorless aqueous phase (which turned deep blue on exposure to air) and copper metal. The metal was filtered off, washed with aqueous ammonia, water and methanol. After drying in vacuo, the product copper weighed 0.56 g. (a 22% yield).

In another run, the glass liner was charged with 5.0 g. (20 mmoles) of $CuSO_4.5H_2O$, 5.25 g. (20 mmoles) $NiSO_4.6H_2O$, 16 ml. of concentrated ammonium hydroxide, 35 ml. of water and 10 ml. of heptane. The autoclave was pressured with 600 psig. each of hydrogen and carbon monoxide and heated 2.5 hours at 150°C. The resultant reaction mixture consisted of an aqueous layer, copper metal, and a colorless organic layer.

The copper metal was removed by filtration, washed and dried in vacuo. The amount of copper was 0.74 grams, a 58% yield.

The nickel yield — determined by treatment of the heptane layer with bromine in $CCl_4$ was 52%. Similar results are obtained when the heptane is omitted.

A copper sample obtained by the procedure above wherein nickel was present in the reaction mixture contained 0.01 to 0.1% nickel.

EXAMPLE 15

A glass liner was charged with 5.0 g., 20.0 mmoles $CuSO_4.5H_2O$, 5.25 g., 20.0 mmoles $NiSO_4.6H_2O$, 21ml. 320 mmoles concentrated $NH_4OH$, 25 ml. water, and 10 ml. heptane. The autoclave was pressured with 640 psi. hydrogen and 1200 psi. carbon monoxide, then heated 2.0 hours at 150°C. The reaction mixture consisted of a colorless upper phase, metallic copper, and a light blue aqueous solution. The heptane phase was siphoned off and combined with subsequent heptane extracts of the aqueous phase. The organic solution was treated with excess bromine in carbon tetrachloride. The resulting mixture was filtered, washed with carbon tetrachloride, and dried. This gave 2.55 g. of light yellow-brown powder, identified as nickel bromide. The amount isolated corresponded to 11.7 mmoles $Ni(CO)_4$, 58% yield based on starting $NiSO_4$.

Copper metal was isolated as above. The yield was 0.90 g. 14.2 mmoles (71% based on starting $CuSO_4$).

The above example can be repeated by using:
- copper concentrations of from 0.001 grams per liter to saturated solution,
- nickel concentrations of from 0.001 grams per liter to saturated solution,
- ammonia concentrations of from 1 to 10 moles per mole of metal.
- hydrogen pressures of from zero to 1200 psig, temperatures of from 100° to 250°C.

However, it should be pointed out that the copper concentration is not critical. In addition, preferred copper concentrations are from 1 to 100 grams per liter. Preferred nickel concentrations are from 1 to 150 grams per liter. Preferred ammonia concentrations are within the range of from 1 to 10 moles per mole of metal. Preferred carbon monoxide pressures are from 200 to 400 psig. A preferred temperature range is from 100° to 200°C. Reaction times are not critical, times of 1 to 4 hours are usually sufficient. The presence of an immiscible organic solvent is not essential. However, because this embodiment lends itself to be an integral feature of a method for separation of copper metal from nickel carbonyl, it is usually preferred to carry out this embodiment in the presence of a solvent for nickel carbonyl. Solvents for this purpose and amounts thereof have been set forth above.

The nickel carbonyl need not be formed in situ. Rather, preformed nickel carbonyl can be added to the reaction mixture.

Another embodiment of this invention is the catalytic effect of manganese carbonyl in the production of copper metal from carbon monoxide reduction of ammoniacal copper ammine solutions.

This is illustrated by the following example.

EXAMPLE 16

A glass liner of a rocking autoclave of roughly 300 ml. capacity was charged with

| | |
|---|---|
| $CuSO_4 \cdot 5H_2O$ | 9.9 g. |
| $Mn_2(CO)_{10}$ | 0.80 g. |
| Conc. $NH_4OH$ | 16 ml. |
| Water | 35 ml. |
| n-Heptane | 10 ml. |

The autoclave was pressured with 600 psi of hydrogen and 600 psi of carbon monoxide, then heated 2.5 hours at 150°. The reaction mixture consisted of a colorless aqueous phase, metallic copper, solid $Mn_2(CO)_{10}$, and a yellow organic phase. The heptane layer was siphoned off, and the remaining catalyst was extracted with heptane and ether. Work up of the organic extracts gave 0.59 g. $Mn_2(CO)_{10}$ (74% recovery). Metallic copper was filtered off, washed with aqueous ammonia, water, and methanol. After drying in vacuo, 1.03 g. of copper (16.2 mmoles, 40.5% yield) was obtained.

The preceding experiment was repeated using the same reaction conditions and the same quantity of reagents, but leaving out $Mn_2(CO)_{10}$ and heptane. There was obtained 0.56 g. 8.9 mmoles of copper metal, representing 22% yield. The aqueous phase of the reaction was colorless, but turned to deep blue color when exposed to air.

Because $Mn_2(CO)_{10}$ is a solid, it is preferred that the process be conducted in the presence of an organic solvent. In contrast, $Ni(CO)_4$ is a liquid and no solvent is required for it to render catalysis of copper metal preparation.

The above example can be repeated — and increased yields of copper obtained — by using:
  copper concentrations of from 0.001 grams per liter to saturated solution,
  manganese carbonyl copper ratios of from 0.001 to 0.5, ammonia concentrations of from 1 to 10 moles per mole of metal,
  hydrogen pressures of from 100 to 1200 psig., carbon monoxide pressures of from 200 to 1200 psig., temperatures of from 100° to 250°C.

However, it should be pointed out that the copper concentration is not critical. In addition, preferred copper concentrations are from 1 to 30 grams per liter. Preferred manganese carbonyl to copper ratio is from 0.01 to 0.4. Preferred ammonia concentrations are within the range of from 2 to 4. Preferred carbon monoxide pressures are from 200 to 400 psig. A preferred temperature range is from 150° to 200°C. Reaction times are not critical; times of 1 to 4 hours are usually sufficient.

Another embodiment is the catalytic effect of cobalt carbonyl in the production of copper metal from carbon monoxide reduction of ammoniacal copper ammine solutions. For example, similar results to those obtained by manganese carbonyl catalysis in Example 16 are obtained when cobalt carbonyl is substituted for the manganese carbonyl.

The following experiments are an indication that manganese carbonyl also catalyzes the formation of nickel carbonyl.

EXAMPLE 17

The glass liner was charged with 10.5 g 40 mmoles $NiSO_4 \cdot 6H_2O$, 0.80 g., 2.05 mmoles $Mn_2(CO)_{10}$, 21 ml. conc. $NH_4OH$ (c.a. 320 mmoles), 25 ml. water, and 10 ml. heptane. The autoclave was pressured with 820 psi $H_2$ and 1300 psi CO, then heated 2.5 hours at 150°, cooled, and vented through a dry ice trap. The reaction mixture consisted of a blue aqueous phase and a yellow organic phase. The heptane layer was siphoned off and the aqueous phase was extracted with about 30 ml. of heptanehexane solution. The combined organic solution was distilled in vacuo into a dry ice-cooled receiver. Work-up of the distillation residue gave 0.53 g., 1.36 mmole $Mn_2(CO)_{10}$, representing 67% recovery. The distillate, containing $Ni(CO)_4$, was treated at −76°C. with bromine-carbon tetrachloride solution until no more gas was evolved and the mixture contained excess of bromine. The suspension was filtered and washed with carbon tetrachloride. After drying in vacuo, 5.93 g. of nickel dibromide was obtained. Thus, the yield of nickel carbonyl was 27.1 mmoles, or 68%.

The amounts of starting materials used were the same as in the preceeding experiment, except that no $Mn_2(CO)_{10}$ was added in this case. The autoclave was pressured with 800 psi $H_2$ and 1200 psi CO and heated 2.5 hours at 150°C. Following the same work-up procedure, 4.86 g. of $NiBr_2$ was obtained. This corresponded to 22.2 mmoles of $Ni(CO)_4$, 56% yield.

As with all processes of this invention — described and illustrated by the above description and examples — the processes of the aforesaid examples are not critically dependent on use of n-heptane. When an essentially water-immiscible solvent is used, it may be any solvent for nickel carbonyl. For economic reasons, aliphatic hydrocarbon materials are preferred solvents. To facilitate $Ni(CO)_4$ stripping the solvent preferably has a boiling point of at least about 36°C. There is no critical upper limit in boiling point of solvent.

From the foregoing description, it can be readily seen that the process of this invention is highly flexible. Thus, any method for obtaining nickel and its associated metals in the desired form for carbonylation may be used. A feature of this invention is, therefore, the combination of various pyrometallurgical, hydrometallurgical, vapometallurgical, and physical separation processes with carbonylation to obtain and separate nickel and its associated metals. Indeed, such combination results in improved processes for winning nickel by advantageously using proven "front-end" processes in handling various types of ores most economically, dissolving or partially dissolving the nickel values in an aqueous ammonium salt or ammonium hydroxide solution and contacting the solution with a carbon monoxide-containing gas under conditions whereby the nickel values are reduced to form nickel carbonyl, copper values are precipitated as metallic copper, and cobalt values remain in aqueous solution as a cobalt carbonyl anion from which it is readily recovered by oxidation to hydrated cobalt oxide. Thus, the overall process effects removal of nickel and those associated metals from the material provided by the front-end process.

The wide applicability of such improved processes is illustrated by combining the above-described reductive carbonylation process with a sulfide or oxide ore leaching process, a ferronickel process, a blast furnace or converter matte process using either sulfide or oxide ores or even a scrap metal recovery process. As a result of such improved processes, substantial savings in operational steps, processing costs, and capital investment are realized.

One source of nickel which contains vast amounts of recoverable nickel and which has been heretofore largely ignored because of its inaccessibility is the ocean floor. Estimates of nickel available from this source are $3.2 \times 10^9$ metric tons of nickel, or about 220 times the world reserves based on 1958 statistics available. The most practical and economically feasible source of nickel from the ocean is black, hydrous manganeseuioxide concretions on the floors of the ocean. These manganese sea nodules contain from 2.0 – 0.31% nickel, 2.3 – 0.06% cobalt, and 1.6 – 0.28% copper. The average composition of manganese nodules in the Pacific Ocean is 0.99% nickel, 0.35% cobalt, and 0.53% copper.

Manganese sea nodules are found in a variety of shapes and sizes. The largest nodule ever recorded was over 18,000 pounds. However, manganese sea nodules generally average from 0.8 – 1.5 inches in diameter and usually do not exceed about 3 inches.

Estimates of the concentrations of manganese sea nodules have been made from photographs and dredging samples of the sea floor. One estimate sets the total tonnage of nodules in the Pacific Ocean at 1,656 billions of metric tons, with over half of this amount about 900 billions of metric tons being located in the central region of the Pacific. In this region it is estimated, based on a limited sampling, that about 0.4 – 7.6 pounds of nodules per square foot exist. Estimates in other portions of the Pacific range from 0.1 – 4.6 pounds per square foot of nodules. However, no intensive sampling has been done to prove out a given location.

The manganese sea nodules may be recovered by dredging with bucket-ladder, wire-line, and hydraulic dredges. For example, drag-bucket, clamshell-dredges, and air-lift hydraulic dredges have been used and are well known to skilled practitioners of the dredging art. Other methods have been proposed for recovery of sea-floor minerals at depths over 1,000 feet, including unmanned crawler-type units, manned bathyscaphes of both the crawler-type and submarines. However, only the well-known deep-sea drag-dredge is practical for commercial operations in the near future.

Processing manganese sea nodules is much like other sources of nickel. Therefore, manganese sea nodules are amenable to the process of this invention. Thus, a preferred embodiment of this invention is a process for recovering nickel values from manganese nodules, said process comprising:
  a. comminuting said nodules;
  b. subjecting the comminuted nodules to a reducing roast to convert the nickel values to nickel metal;
  c. cooling the reduced nodules under non-oxidizing conditions;
  d. oxidatively leaching said reduced nodules with an aqueous ammoniacal ammonium carbonate solution by injecting an oxygen-containing gas into a slurry of said reduced nodules in said aqueous ammoniacal ammonium carbonate solution;
  e. contacting the resultant leach solution containing nickel ammine salt complexes with a carbon monoxide- containing gas under conditions whereby the nickel values are reduced to form nickel carbonyl;
  f. separating said nickel carbonyl from the leach solution; and
  g. decomposing said nickel carbonyl to metallic nickel.

As previously described in the foregoing preferred embodiments, the above process can be further characterized by carrying out the contacting of step (c) in the presence of an essentially water-immiscible, substantially inert solvent for nickel carbonyl whereby the nickel carbonyl is concentrated in said solvent. A preferred solvent is a saturated hydrocarbon. Also, a preferred process of this embodiment is further characterized by carrying out the contacting of said step (c) in the presence of an amount of cyanide ion sufficient to catalyze the formation of nickel carbonyl. A preferred amount of cyanide ion is from 0.01 to 1 mole of cyanide ion per mole of nickel.

The aqueous ammoniacal ammonium salt solution is preferably selected from aqueous ammoniacal ammonium chloride, carbonate, sulfate or mixtures thereof. Also, aqueous ammonium hydroxide may be used. A preferred aqueous ammoniacal ammonium salt is aqueous ammoniacal ammonium carbonate.

Instead of carrying out the contacting in a solvent and separating the nickel carbonyl thereby, nickel carbonyl produced is preferably separated from the leach solution by passing a carbon monoxide-containing gas through the leach solution allowing the nickel carbonyl to vaporize into the carbon monoxide-containing gas and subsequently passing said carbon monoxide-containing gas into a thermal decomposition zone wherein nickel carbonyl is thermally decomposed to metallic nickel.

From the above preferred embodiment and the foregoing descriptions of other preferred embodiments it should be clear that this process also may be employed to recover nickel, copper, and cobalt from manganese nodules. Such a preferred embodiment is a process for recovering nickel, copper, nd cobalt from manganese nodules by a process comprising:
  a. comminuting said manganese nodules;
  b. subjecting the comminuted nodules to a reducing roast to convert the nickel, copper and cobalt to nickel metal, copper metal and cobalt metal;
  c. cooling the reduced nodules under non-oxidizing conditions;
  d. oxidatively leaching said reduced nodules with an aqueous ammoniacal ammonium carbonate solution by injecting an oxygen-containing gas into a slurry of said reduced nodules in said aqueous ammoniacal ammonium carbonate solution;
  e. contacting the resultant leach solution containing nickel, copper, and cobalt ammine salt complexes with a carbon monoxide-containing gas under conditions whereby the nickel, copper, and cobalt values are reduced to nickel carbonyl, metallic copper and cobalt tetracarbonyl anion;
  f. separating said nickel carbonyl from said leach solution;
  g. decomposing said nickel carbonyl to metallic nickel;
  h. recovering said metallic copper;
  i. separating the cobalt from the leach solution by injecting an oxygen-containing gas into said solution whereby said cobalt tetracarbonyl anion is oxidized to hydrated cobalt oxide; and
  j. heating said hydrated cobalt oxide at a temperature sufficient to drive off the waters of hydration to produce cobalt oxide.

Of course, the previously described process expedients of using a solvent and an amount of cyanide ion sufficient to catalyze the formation of nickel carbonyl are also preferred embodiments of this process. Instead of the solvent, a carbon monoxide-containing gas may be used to sweep out the nickel carbonyl to the thermal decomposition zone.

In either of the foregoing embodiments using manganese nodules, the comminuted nodules may be subjected to a reducing roast prior to the leach step to convert a substantial amount of the nickel, copper, or cobalt to the metal. Also, instead of using an ammoniacal ammonium salt leach the nodules may be leached with acid (e.g., concentrated $H_2SO_4$) to dissolve the nickel, copper, and cobalt values. The free acid can then be neutralized using for example coral mud or clamshells and the neutralized leach rendered basic with ammonia. This solution can then be subjected to the reductive carbonylation and subsequent steps described above and throughout this specification.

In all of the preferred embodiments described hereinabove, the conditions of catalyst, aqueous ammoniacal ammonium salt, solvent, temperature, pressure, carbon monoxide-containing gas, oxygen-containing gas, and carbon monoxide sweep are similar to those described broadly for the general process of reductive carbonylation and are applicable to the specific processes wherein this step is employed.

Therefore, it is desired that the invention be limited only within the lawful scope of the appended claims.

We claim:

1. A process for recovering nickel values from manganese sea nodules, said process comprising:
   a. comminuting said nodules;
   b. subjecting the comminuted nodules to a reducing roast to convert the nickel values to nickel metal;
   c. cooling the reduced nodules under non-oxidizing conditions;
   d. oxidatively leaching said reduced nodules with an aqueous ammoniacal ammonium carbonate solution having a molar ratio of ammonia to metal of from 0:1 to 100:1 by injecting an oxygen-containing gas into a slurry of said reduced nodules in said aqueous ammoniacal ammonium carbonate solution;
   e. contacting the resultant leach solution containing nickel ammonium salt complexes with a carbon monoxide-containing gas at a temperature of from about 50° to about 250°C and a pressure of from about 50 to about 3000 psig whereby the nickel values are reduced to nickel carbonyl;
   f. separating said nickel carbonyl from said leach solution; and
   g. decomposing said nickel carbonyl to metallic nickel.

2. A process of claim 1 wherein the molar ratio of ammonia to metal in said ammoniacal ammonium carbonate solution in said step (d) is from 0:1 to 10:1.

3. A process of claim 1 wherein said temperature in said step (e) is from about 100° to about 175°C.

4. A proccess of claim 1 wherein said contacting in said step (e) is carried out at a pressure of from about 50 to about 1800 psig.

5. A process of claim 1 wherein said contacting in said step (e) is carried out in the presence of a catalytic amount of a ligand selected from the group consisting of cyanide, sulfide, cysteine and tartrate.

6. A process of claim 5 wherein said ligand is present at a ratio of from about 0.01 to about 1 mole of said ligand per mole of said nickel.

7. A process of claim 1 wherein said contacting in said step (e) is carried out in the presence of a catalytic amount of a cyanide ligand and said cyanide ligand is present at a ratio of from 0.01 to 0.5 mole of said cyanide ligand per mole of said nickel.

8. A process of claim 1 wherein said carbon monoxide-containing gas in said step (e) is selected from the group consisting of carbon monoxide and synthesis gas.

9. A process of claim 1 wherein said carbon monoxide-containing gas in said step (e) is carbon monoxide.

10. A process of claim 1 wherein said contacting in said step (e) is carried out in the presence of an essentially water-immiscible, substantially inert solvent for nickel carbonyl, whereby said nickel carbonyl is concentrated in said solvent.

11. A process of claim 1 wherein said contacting in said step (e) is carried out in the presence of an essentially water-immiscible, substantially inert solvent for nickel carbonyl which is a saturated aliphatic hydrocarbon, whereby said nickel carbonyl is concentrated in said saturated aliphatic hydrocarbon solvent.

12. A process of claim 1 wherein said nickel carbonyl is separated in said step (f) from said solution by passing a carbon monoxide-containing gas through said solution, allowing said nickel carbonyl to vaporize into said carbon monoxide-containing gas and subsequently passing said carbon monoxide-containing gas into a thermal decomposition zone, wherein said nickel carbonyl contained in said carbon monoxide-containing gas is decomposed to metallic nickel according to said step (g).

13. A process of claim 1 wherein said manganese sea nodules contain recoverable amounts of nickel, copper, and cobalt, said process comprising:
   a. comminuting said manganese nodules;
   b. subjecting the comminuted nodules to a reducing roast to convert the nickel, copper, and cobalt to nickel metal, copper metal, and cobalt metal;
   c. cooling the reduced nodules under non-oxidizing conditions;
   d. oxidatively leaching said reduced nodules with an aqueous ammoniacal ammonium carbonate solution having a molar ratio of ammonia to metal of from 0:1 to 100:1 by injecting an oxygen-containing gas into a slurry of said reduced nodules in said aqueous ammoniacal ammonium carbonate solution;
   e. contacting the resultant leach solution containing nickel, copper, and cobalt ammonium salt complexes with a carbon monoxide-containing gas at a temperature of from about 50° to about 250°C and a pressure of from about 50 to about 3000 psig whereby the nickel, copper, and cobalt values are reduced to nickel carbonyl, metallic copper, and cobalt tetracarbonyl anion;
   f. separating said nickel carbonyl from said leach solution;
   g. decomposing said nickel carbonyl to metallic nickel;
   h. recovering said metallic copper;
   i. separating said cobalt from said leach solution by injecting an oxygen-containing gas into said solution whereby said cobalt tetracarbonyl anion is oxidized to hydrated cobalt oxide; and
   j. heating said hydrated cobalt oxide at a temperature sufficient to drive off the waters of hydration to produce cobalt oxide.

* * * * *